BINARY STORAGE MEANS

Filed July 16, 1953

2 Sheets-Sheet 1

INVENTOR
HERMAN EPSTEIN
BY
Raymond B. Parker
ATTORNEY

INVENTOR
HERMAN EPSTEIN
BY
Ralzemond B. Parker
ATTORNEY 2,922,143

BINARY STORAGE MEANS

Herman Epstein, Philadelphia, Pa., assignor to Burroughs Corporation, Detroit, Mich., a corporation of Michigan Application July 16, 1953, Serial No. 368,250

25 Claims. (Cl. 340—174)

This invention relates to means for storing binary signals and more particularly it relates to detection devices for determining the state of storage in materials having electrical properties.

Bistable materials including ferroelectric and ferromagnetic devices preferably have a substantially rectangular hysteresis characteristic. Signals having two separate senses applied to such materials cause them to attain a corresponding polarity or state, thereby serving to store the information contained in the signals. In reading out the stored information it is difficult with some prior art devices to obtain a good waveform shape. In many cases read-out so distorts the pulse waveforms that expensive shaping circuits must be used to restore the signals to usable form.

Non-destructive read-out is convenient in many circuit applications of binary storage devices. Therefore detection devices should be capable of optional operation either with destructive or non-destructive read-out as desired.

High signal output levels are important not only to provide good signal to noise characteristics but to permit direct cascading of storage elements without intermediate amplification. Low signal attenuation therefore is desirable in a read-out system and if possible signal gain without the use of amplifier stages.

It is therefore a general object of the invention to provide improved binary storage means to afford improved operational features such as described above.

More specifically it is an object of the invention to provide detection means for information stored in materials having bistable properties.

A further objective of the invention is the provision of non-destructive read-out from circuits containing bistable storage devices.

Another object of the invention is to afford read-out signals of high amplitude and good wave shape from circuits containing bistable storage devices.

Further objects and advantages of the invention may be realized from consideration of the following specification. Realization of the objectives is accomplished by including a bistable state storage device as a switching reactance in a tuned resonant circuit. Switching of the storage state responsive to read-out signals then causes the circuit to become temporarily resonant at a different frequency. By choosing a storage device such as a ferroelectric capacitor with a substantially rectangular hysteresis characteristic, enough detuning of the resonant circuit may be accomplished that read-out pulses may be directly derived without frequency selection circuitry.

A more thorough consideration of the invention, its organization and mode of operation follows with reference to the accompanying drawing, in which.

Like reference characters are used to designate similar component features throughout the several views to facilitate comparison.

Figure 1:
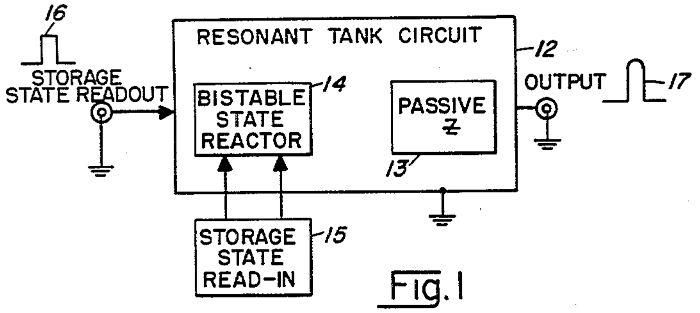
Fig. 1 is a block diagram of a binary storage system operable in accordance with the teachings of the present invention.

In general, operation in accordance with the present invention may be obtained with a circuit as shown in Fig. 1. A resonant tank circuit comprises both a non-switching reactor or impedance device 13 and a switching, or bistable state reactor device 14 which is set in a desired storage state by means of a read-in circuit 15.

The read-out signal pulse 16 to the resonant tank circuit is preferably coextensive with the switching time of the bistable state reactor during which the reactance of the bistable state reactor will be at a different value than during non-switching conditions. The parameters of the tank circuit are chosen for resonance (or non-resonance) to read-out pulses during this period at a base frequency $f_0$. In general, if Q is the merit factor of the resonant circuit a signal gain will be realized in the output signal 17 when operated at resonance. The resonance frequency $f_0$ is preferably chosen so that the input pulse is a half wavelength at resonance frequency. The output pulse therefore is of the same general shape as the input pulse and generally corresponds to a half sine wave at the output frequency $f_0$. Such an output signal is highly desirable for direct use in many electronic circuits without shaping or amplification. In general, proper phasing of the hereinafter described circuits may be readily approximated to provide output signals coextensive in time with the corresponding read-out signals.

Figure 2:
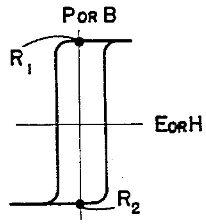
Fig. 2 is a typical rectangular hysteresis characteristic of bistable state materials.

As the hysteresis curve of a storage material becomes substantially rectangular as shown in Fig. 2, the switching impedance elements attain a very high value during the switching interval. This is true in both ferromagnetic and ferroelectric devices. The remanence condition $R_1$ and $R_2$ represent the two stable states of polarization P for a ferroelectric device, or the magnetization B of a ferromagnetic device, which is respectively established by either a read-in potential E or magnetizing force H. It is noted that a ferroelectric substance is one whose dielectric properties behave in a manner similar to the magnetic properties of a ferromagnetic material, rather than a substance containing ferrous compounds. Such substances are well known in the art, with barium titanate crystals being an example.

Figure 3:
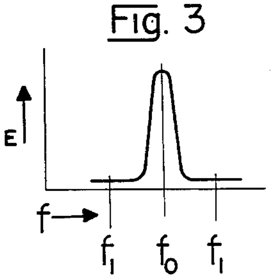
Fig. 3 is a graph indicating resonance of a tuned tank circuit.

With a large change of reactance between switching and non-switching conditions, the resonance characteristics of a tank circuit for one value of reactance, as designated at $f_0$ in Fig. 3, may be caused to occur at a remote position in the frequency spectrum from the resonance at $f_1$ for the other value of reactance. Recalling that the resonant condition $f_0$ may occur only during switching, with ideal conditions where resonance $f_1$ is at either 0 (direct current) or $\infty$, there would be no output pulse derived from the tank circuit responsive to an input pulse of non-switching polarity. In general, the closer the approximation to this condition, the better distinction between switching periods and non-switching periods and therefore the better signal to noise characteristic. Therefore a substantially rectangular hysteresis characteristic is preferred. Other specific ways of providing good signal to noise ratios are described hereinafter.

Detection of the storage state of bistable materials is made by the response of different circuitary to the change in characteristics caused by switching of the storage state of the material. Thus, if a material is switched from the "1" state to the "0" state in response to a "0" readout signal an indication is given, whereas if the material is in the "0" state no indication is given. Conversely, the indications may be effected in opposite sense. Systems utilizing such principles are well known in the art and therefore need not be described in detail to afford an understanding of this invention.

Figure 4:
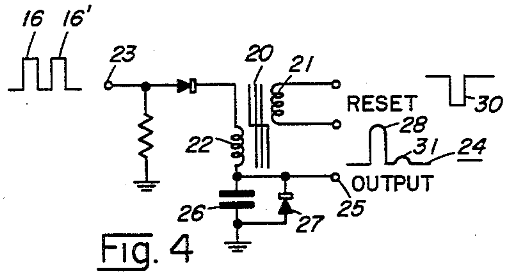
Fig. 4 is a schematic circuit diagram of a detector utilizing a bistable state inductor.

Referring now to Fig. 4 a bistable state ferromagnetic material 20 is utilized as a transformer core having wound thereon a reset winding 21 and an input-output winding 22. This is a typical ferromagnetic switching device, but other arrangements may be used in accordance with the principles of this invention. Two consecutive input pulses 16 and 16' are provided at input terminal 23. These representative idealized pulses are also shown in the waveform chart of Fig. 6*a* as compared with other waveforms such as the output waveform 24 of Fig. 6*b* which appears at the output terminal 25.

The bistable state inductive reactor 20 together with capacitor 26 forms a series resonant circuit which is caused to resonate at a frequency $f_1$ higher than $f_0$ during non-switching of the reactor 20. During switching the inductive reactance increases thereby lowering the resonant frequency to $f_0$, which is chosen with a half wavelength $\lambda_2$ shown in Fig. 6*d* corresponding to the width of the input pulse 16. Normally in a resonant circuit, damped oscillations occur responsive to an exciting pulse such as those of Fig. 6*d*. However, the diode 27 is used to pass only the first excursion (positive as shown) of the oscillations. Any negative excursion is shunted from the output circuit across capacitor 26 as indicated by the flattened negative excursion 29 in Fig. 6*b*. Thus it can be seen that during the first positive half-cycle 28 of the oscillation, the diode 27 is a high impedance to the signal and the circuit acts as if the diode 27 were not even present (that is to say, an open circuit) thereby providing a series resonant circuit including the inductive winding 22 and the capacitor 26. On the following negative half-cycle 41 of the oscillation the diode 27 is a low impedance to the signal and the output is reduced in two ways. First, the capacitor 26, itself is shorted and what was formerly (on the positive half-cycle 27) a series resonant circuit is now reduced to an inductive winding 22, returned to ground through the diode 27. Since the circuit is no longer a tank circuit oscillations will cease at this point. Second, the diode 27 is placed across the output 25 as well as the capacitor 26. Therefore any negative pulse which is supplied to the output 25 is effectively shorted out.

When the read-out pulse is positive, the core 20 must originally be set in a negtaive polarity with reset pulse 30 to afford the output indication 28 at a later time in response to input pulses 16. During reset the diode 27 shorts out the capacitor 26 and therefore causes only the inductor to remain in circuit. This is important since otherwise a circuit series resonant to the reset pulses would be a low impedance load on the reset circuit. For sine waves and high quality components the impedance may approach zero. It is noted that there is a difference in operation of the described circuits for pulse signals as compared with sine wave signals. In general, however, the pulses may be shaped to give desired results by including strong sine wave components thereby approaching the results obtainable with sine waves, if desired. Reset with lower power is generally possible with the diode shunt causing only the bistable state reactor to appear in the reset circuit.

Assuming a single reset pulse 30 just before the two consecutive read-out pulses 16 and 16', a second strong output indication will not be provided but an alternative low level indication 31. This occurs since the first read-out pulse 16 switches the reactor to a positive state. A further positive read-out pulse 16' therefore does not switch the core and the circuit is off resonance at a higher frequency $f_1$ for this condition. Since the output voltage across the reactive component of a series resonant circuit is greater than the input potential there is a voltage gain in a series resonant circuit during switching. Conversely, high voltage losses occur during non-switching. This, in part, accounts for the difference in output signal level between switching and non-switching read-out conditions. It is recalled that if the bistable reactor has a substantially square hysteresis curve, the circuit parameters provide essentially no output indication during non-switching. Accordingly, a good signal to noise ratio is obtainable with the proper circuit parameters. It is noted that large internal current flow occurs in a series resonant circuit thereby generally satisfying the requirements for switching an inductive bistable state device.

Figure 5:
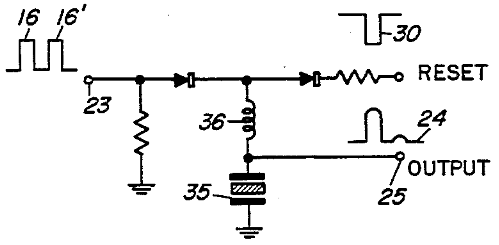
Fig. 5 is a schematic circuit diagram of a detector utilizing a bistable state capacitor.
Figure 6:
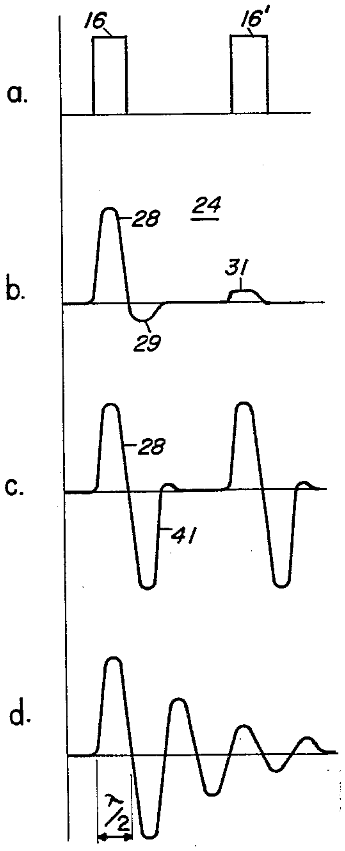
Fig. 6 is a waveform chart illustrating representative wave excursions illustrative of principles of the invention.

The circuit of Fig. 5 similarly stores signals in a bistable state capacitive reactance 35 such as the ferroelectric devices hereinafter described, with the associated inductor 36 providing therewith a series resonant circuit. As in Fig. 4 the resonant frequencies of the series circuit during readout will depend upon the impedance of the bistable state device 35. Thus, if the readout signal 16 tends to establish the opposite storage state in the ferroelectric device 35 to the resident state, the capacity is very high, as seen by consideration of the EP hysteresis wave of Fig. 2, whereas conversely the capacity is very low when the readout signal tends to establish the same state in the ferroelectric device 35 as the resident state. Accordingly, the frequency of the circuit is changed enough to give the characteristics shown in the curve of Fig. 3 corresponding to the respective frequency conditions $f_0$ and $f_1$. At the frequency $f_0$ therefore a high output signal potential is afforded at terminal 25, and conversely at the frequency $f_1$ a small output signal potential occurs. In this arrangement as well as that of Fig. 4 additional advantage is obtained in the signal to noise operation if sine wave read-out signals are approximated. This occurs because the non-switching frequency $f_1$ is higher than the switching frequency $f_0$ causing the circuit to become inductive in the $f_1$ state. Accordingly, the major portion of signal drop will occur across the inductor 36 rather than the output capacitor 35, serving to further attenuate any undesired signal component 31 as shown in Fig. 6*b*. When the hysteresis curve is rectangular the frequency $f_1$ becomes so high that the relative energy of the input pulse in that frequency band is small enough as to become negligible in many cases.

Figure 7:
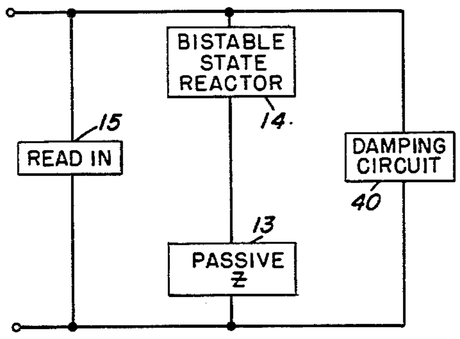
Fig. 7 is a block circuit diagram illustrating circuits constructed in accordance with one phase of the invention.

Considering together the block diagram of Fig. 7 with the waveform of Fig. 6*c*, it is seen that proper circuit losses may be introduced with a non-asymmetrical damping circuit 40 so that two oscillatory excursions may be made in the resonant circuit. Critical damping techniques are well known in the art and therefore need not here be described in detail. However, it is noted that a second oscillatory excursion will cause switching of the cell and provide a strong output excursion 41 in the output reactance, when not shunted with a diode. This is useful as an automatic reset feature and may be utilized to provide "non-destructive" read-out.

Figure 8:
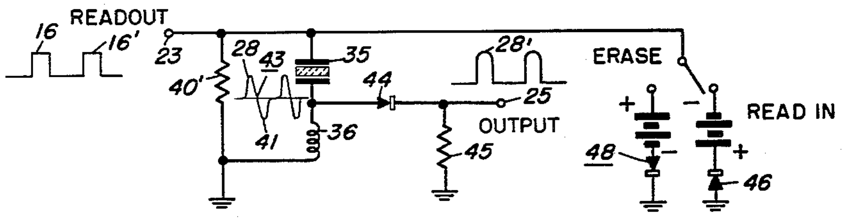

Automatic reset is illustrated in connection with the circuit shown in Fig. 8. The damping resistor 40', or some other suitable circuitry for affording critical damping, is so selected that a complete oscillatory cycle 43 is produced in the tank circuit for each read-out pulse 16. The negative excursion 41 (as shown in the drawing) causes the core to switch after the positive excursion 28 causes an output pulse 28' to be provided. It is noted that the clipping diode 44 for the output signal does not substantially retard oscillations in the tank circuit by shorting out inductor 36 since the output resistor 45 in series therewith has relatively high impedance.

The read-out pulses cause the storage device to remain in the same state originally stored since the circuit affords little response to read-out pulses when in the same polarity as to that stored, thereby not causing the device to switch, and conversely causing a complete oscillatory switching cycle to occur when the read-out pulses are in the opposite polarity to that stored. This is true even with a usual read-in pulse so that special precautions must be taken for storing signals. If the read-in circuit is designed to additionally load the tank circuit enough to cause critical damping over a half cycle period rather than the complete cycle, read-in may be accomplished as usual. One desirable way to provide this action is to place a diode 46 in the read-in circuit to short out the negative excursion. When damping is accomplished with an asymmetrical device such as the diode, similar means 48 is also needed to erase a signal if desired. In this manner, either "1" or "0" signals may be read-in and an output indication responsive to a read-out pulse would be afforded for only one of the read-in states. Thus as a read-in pulse is inserted to the series resonant circuit, a low impedance source and series diode 46 or 48 in shunt with resistor 40' critically damp the resonant circuit so that only one-half of the oscillation cycle 43 occurs. The polarity of the half cycle is determined by the erase switch setting. A single half oscillation cycle therefore presents a very high potential across the bistable storage device 35 to leave it in a corresponding storage state. However, as hereinbefore explained, without the additional damping provided by the read-in circuits, the resistor 40' provides critical damping for a complete oscillation cycle, thereby affording an output pulse 28' for the first half of the cycle and returning the storage state of the bistable element 35 to its original condition during the second half of the cycle. Otherwise, the storage state would be reversed by the read-out cycle when information is stored in the element 35 in the polarity opposite that tended to be set by the read-out signal. As hereinabove mentioned, when the stored information is of the same polarity, the tuned circuit is off frequency and not enough potential is developed for causing either a read-out signal or a change in the storage state.

Figure 9:
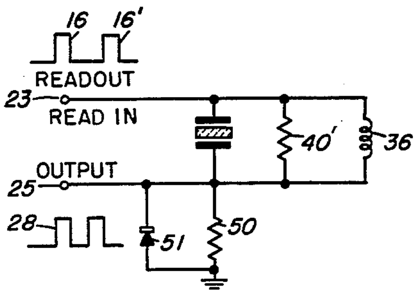
Figs. 8 to 11 are schematic circuit diagrams of further useful embodiments of the invention.

Parallel resonant tank circuits may also be used, as shown in Fig. 9, for either destructive or non-destructive read-out, depending upon the value of the damping resistor 40. In the embodiment shown in this figure, the tank circuit is connected in series with an output resistor 50. This resistor is shunted by diode 51 so that a single polarity output pulse will be provided and so that read-in may be accomplished efficiently in the general manner hereinbefore described. Thus diode 51 corresponds to diode 27 of Fig. 4 and affords low impedance to input signals to enable substantially all of the read-in energy supplied between terminal 23 and ground to be expended in the damped parallel resonant tank circuit. If the tank circuit is critically damped for a half cycle destructive read-out occurs and the read-in signal will cause the ferroelectric storage element to attain its reference storage state, but as mentioned in connection with the embodiment of Fig. 8, if non-destructive read-out is afforded by choosing the value of resistor 40 for critically damping oscillations after a full cycle, the read-in signal circuit must supply an additional damping effect to assure that the storage state is established in the reference polarity. In this embodiment, the tank circuit is resonant to wavelengths corresponding to input read-out pulses when the bistable state storage device is not switching. Accordingly the tank circuit has very high impedance and little of the pulse energy is developed across resistor 50. Conversely, when switching, substantially the entire read-out pulse appears across output resistor 50 in its original waveform. Therefore, the read-in energy in this embodiment is derived directly from the read-in signal, and does not afford the signal gain of the series resonant circuit embodiments of Figs. 4, 5 and 8.

Figure 10:
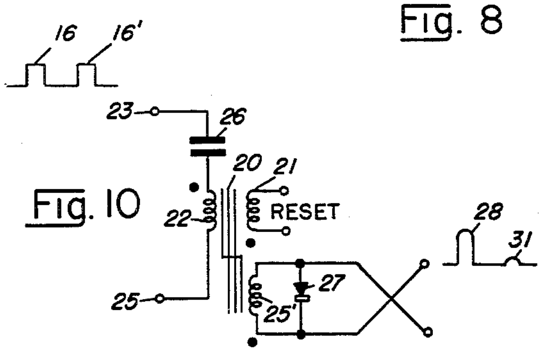

In a series resonant circuit constructed as taught by Fig. 10, signal amplification results by taking the output signal from an additional output winding 25' on the bistable state storage device 20 rather than the auxiliary reactor 26. This transformer step-up action together with the signal gain realized as hereinbefore mentioned from the action of the series resonant tank circuit 26, 22 provides high signal amplitude and additionally permits direct current isolation of the output circuits from the tank circuit. Operation during read-in, reset, and read-out is like that described in connection with Fig. 4, except that the signal is taken from the bistable state element 20 rather than the auxiliary reactor 26. In this respect the operation is analogous to the hereinbefore described circuit of Fig. 5, and employs the characteristics shown by Fig. 3 to cause the series resonant circuit to either be on or off frequency with respect to the input signals 16. Many variations will be suggested to those skilled in the art, such as the particular circuitry for read-out, etc. These variations may be effected without departing from the spirit or scope of the present invention.

Figure 11:
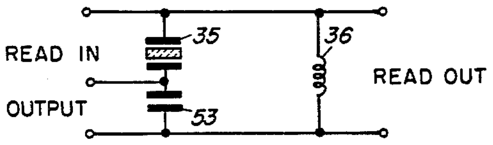

Parallel resonant tank circuits may be utilized to the same advantage by taking the output signal from a capacitive component 53 as shown in Fig. 11, or conversely from the inductive component. It is noted that parallel resonant circuits are useful when a current gain is desired in the output signal as compared to that of the input signal.

Figure 12:
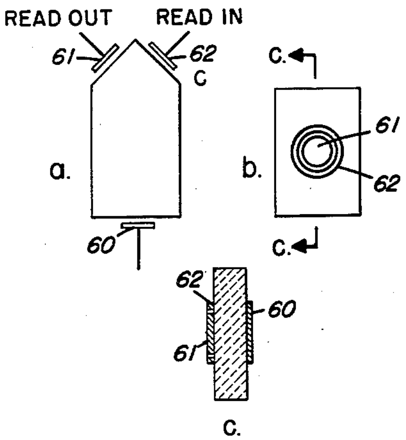
Fig. 12 shows diagrammatic views of ferroelectric bistable state storage devices constructed in accordance with a particular aspect of the invention.

Other precautions may be taken with read-in to a non-destructive system of the type described than the critical damping technique hereinbefore described. Thus, the resonant circuit may be critically damped for a complete cycle of oscillation in one circuit and for a half cycle of oscillation in another circuit, but direct current isolation may be desired between the two circuits. This may be effected by providing separate read-in and read-out paths in a special crystal structure of the nature of that shown in Fig. 12. Thus, three (or more) electrodes are so arranged that a common path is intercepted by the field between a common electrode 60 and the other two electrodes 61 and 62. The state of material in the common path in this manner may be sensed in a resonant circuit of the type described without coupling the read-in circuit to the resonant circuit. Heretofore it has not been possible to provide electrically isolated circuits common to a single ferroelectric storage device in a manner analogous to providing multiple windings about a ferromagnetic core. Such ferroelectric crystal structure is useful in any system requiring isolation of different circuits. In Fig. 12*a*, the common path is provided by a long thin crystal having electrodes 61 and 62 at one end and electrode 60 at the other. If electric field lines are established between electrodes 60 and 61 they will pass through substantially the same crystal regions as the corresponding electric field lines between electrodes 60 and 62. Thus the state of the crystal may be either changed or detected from the separate electrodes.

The structure of Figs. 12*b* and *c* may be used if thinner crystals are employed. Thus concentric electrodes 61 and 62 on one side of the crystal form field lines through the crystal to electrode 60 which intercept common crystal structure, and therefore the separate read-in and read-out functions may be accomplished with circuits which are electrically isolated for direct current.

The principles and advantages of the invention have been hereinbefore set forth together with those descriptional details which will teach the invention to those skilled in the art. The features believed descriptive of the nature of the invention are defined with particularity in the appended claims. It is noted that particular circuit requirements may vary to such large extents in different systems that the individual circuit parameters must be chosen for proper operation to suit the environment. For example, different pulse shapes and circuit impedance requirements, may result in different embodiments of the present invention. The appended claims define with particularity those features believed descriptive of the nature and scope of the invention.

What is clamed is:

1. A system for detecting the storage condition in a bistable state storage device comprising a bistable state storage device, a resonant circuit including said device as a reactive element thereof and means for changing the state of said bistable device whereby the frequency of resonance changes with read-out of different storage states of said device, said states being switching and non-switching conditions of said device, and detection means for prodcing an output signal in response to the change in state of said device.

2. The system defined in claim 1 wherein the detection means is coupled to a single reactive element in said resonant circuit.

3. A system as defined in claim 1 including means coupled to said resonant circuit for damping said circuit critically for a full cycle of oscillation, and means for further critically damping the resonant circuit during read-in of information to the reactor to permit only a half oscillation cycle.

4. A system as defined in claim 1 wherein said bistable device is a ferroelectric bistable state storage device comprising a crystal body having three electrodes so arranged that a common path is intercepted by the field between a common electrode and the other two electrodes.

5. A system for detecting signals stored in a bistable state reactive storage circuit comprising a resonant tank circuit including a bistable state device and having a resonant frequency lower during switching of the bistable device than during non-switching, means responsive to read-out signals coupled to said storage circuit to selectively establish the resonant frequency of said tank circuit at one of two values $f_0$ and $f_1$ corresponding to read-out of the two respective storage states of said device, and detection means for producing an output signal during the switching of the device from one state to another in response to the change of resonant frequency in said tank circuit.

6. A system as defined in claim 5 wherein the read-out signals are pulses with a time duration $t$, and wherein a half wavelength at the resonant frequency of said tank circuit for one reactance value of said device is substantially equal to the time duration $t$ of the input pulses.

7. A system as defined in claim 5 wherein an output circuit is coupled to a non-switching reactive element of said tank circuit.

8. A system as defined in claim 7 wherein an asymmetrical device is coupled across the output reactive element.

9. A system as defined in claim 5 wherein an output circuit is coupled to the bistable state storage device.

10. A system as defined in claim 5 wherein an output circuit is coupled to a capacitive reactance in said tank circuit.

11. A system as defined in claim 5 wherein the storage device comprises a ferroelectric crystal body having three electrodes so arranged that a common path is intercepted by the field between a common electrode and the other two electrodes.

12. A system as defined in claim 5 wherein an output circuit is coupled to said tank circuit, and an asymmetrical device is coupled across the output circuit.

13. A system as defined in claim 5 wherein the tank circuit is series resonant.

14. A system as defined in claim 13 wherein circuit parameters are chosen so that the tank circuit is resonant to half wavelengths corresponding to input read-out pulses during the read-out condition.

15. A system as defined in claim 5 wherein the tank circuit is parallel resonant.

16. A system as defined in claim 5 wherein circuit parameters are chosen so that the tank circuit is non-resonant to half wavelengths corresponding to read-out pulses.

17. A system as defined in claim 5 wherein the tank circuit is series connected with an output impedance device.

18. A system as defined in claim 5 wherein the tank circuit includes means for damping oscillations therein caused by a read-out pulse after one complete cycle whereby non-destructive read-out is afforded, and wherein read-in circuit means is coupled to said tank circuit simultaneously with additional damping means so chosen that oscillations are damped after one half a complete cycle.

19. A system as defined in claim 18 wherein the damping means comprises asymmetrical switching means in the read-in circuit.

20. A system as defined in claim 5, wherein the tank circuit includes means for damping oscillations therein caused by a read-out pulse after one complete cycle whereby non-destructive read-out is afforded and wherein said storage device is a ferroelectric device having three electrodes so arranged that a common path is intercepted by the field between a common electrode and the other two electrodes.

21. A system as defined in claim 5 wherein the storage device is ferromagnetic.

22. A system as defined in claim 5 wherein the storage device is ferroelectric.

23. In an electrical system for providing amplified signal outputs, an electrical network, an electrical storage element in the network capable of assuming two electrical conditions and of producing a dynamic impedance characteristic during the transition from one condition to the other condition, electrical energizing means connected to the electrical network and operable to supply energy to the storage element to set the same in only one of said two conditions, a second electrical energizing means characterized as being capable of delivering larger quantities of power than the first mentioned energizing means connected to the electrical network and operable to supply read-out signals to the storage element and cause the element to go through a transition upon finding said element in said preselected condition to thereby produce the dynamic impedance characteristic, an impedance element in the network connected in series with said storage element to receive currents flowing therethrough from the second energizing means, said elements having such relative impedance values that the current flowing therethrough from the second energizing means reproduces a small read-out signal at the impedance element when the condition of the storage element remains unchanged but reproduces an amplified read-out signal when the circuit element goes through a transition to arrive at the second of said two conditions, and utilization means coupled to one of the elements for receiving the amplified electrical signals.

24. In an electrical system for providing amplified signal outputs, an electrical network, an electrical storage element in the network capable of assuming two electrical conditions and of producing a dynamic impedance characteristic during the transition from one condition to the other condition, electrical energizing means connected to the electrical network and operable to supply energy to the storage element to set the same in only one of said two conditions, a second electrical energizing means characterized as being capable of delivering larger quantities of power than the first mentioned energizing means connected to the electrical network and operable to supply read-out pulses to the storage element and cause the element to go through a transition upon finding said element in said preselected condition to thereby produce the dynamic impedance characteristic, a dissimilar impedance element in the network connected in series with said storage element to receive current pulses flowing therethrough from the second energizing means, said elements further having such relative impedance values that pulses flowing therethrough from the second energizing means reproduce a small read-out signal pulse at the impedance element when the condition of the storage element remains unchanged but reproduce an amplified read-out signal pulse when the circuit element goes through a transition to arrive at the second of said two conditions, and utilization means coupled to one of the elements for receiving the amplified electrical signal pulses.

25. In an electrical system for providing amplified signal outputs, an electrical network, an electrical storage element in the network capable of assuming two electrical conditions and of producing a dynamic impedance characteristic during the transition from one condition to the other condition, electrical energizing means connected to the electrical network and operable to supply energy to the storage element to set the same in only one of said two conditions, a second electrical energizing means characterized as being capable of delivering larger quantities of power than the first mentioned energizing means, connected to the electrical network and operable to supply read-out pulses to the storage element and cause the element to go through a transition upon finding said element in said preselected condition to thereby produce the dynamic impedance characteristic, an impedance element in the network connected in series with said storage element to receive current pulses flowing therethrough from the second energizing means, said elements having such relative impedance values that pulses flowing therethrough from the second energizing means reproduce a small read-out signal pulse at the impedance element when the condition of the storage element remains unchanged but reproduce an amplified read-out signal when the circuit element goes through a transition to arrive at the second of said two conditions, and utilization means coupled to the impedance element for receiving the amplified electrical signal pulses.

References Cited in the file of this patent

UNITED STATES PATENTS

| | | |
|---|---|---|
| 2,614,167 | Kamm | Oct. 14, 1952 |
| 2,653,254 | Spitzer | Sept. 22, 1953 |
| 2,682,615 | Sziklai et al. | June 29, 1954 |
| 2,697,178 | Isborn | Dec. 14, 1954 |
| 2,697,825 | Lord | Dec. 21, 1954 |
| 2,773,198 | Duinker | Dec. 4, 1956 |
| 2,822,480 | Isborn | Feb. 4, 1958 |

OTHER REFERENCES

Publication I, Proceedings of I. R. E., June 1950, pp. 626–629.

Publication II, Electrical Engineering, October 1952, pp. 916–922.

UNITED STATES PATENT OFFICE

CERTIFICATE OF CORRECTION

Patent No. 2,922,143 January 19, 1960

Herman Epstein

It is hereby certified that error appears in the printed specification of the above numbered patent requiring correction and that the said Letters Patent should read as corrected below.

Column 3, line 62, for "negtaive" read -- negative --; column 7, line 12, for "clamed" read -- claimed --; line 21, for "prodcing" read -- producing --; column 8, line 7, claim 16, and line 11, claim 17, for the claim reference numeral "5", each occurrence, read -- 15 --; line 57, for "current" read -- currents --.

Signed and sealed this 19th day of July 1960.

(SEAL)
Attest:

KARL H. AXLINE
Attesting Officer

ROBERT C. WATSON
Commissioner of Patents